June 25, 1963    W. REICHE ETAL    3,094,911
PHOTOGRAPHIC CAMERA

Filed Dec. 7, 1959    4 Sheets—Sheet 2

INVENTORS
Wilhelm Reiche
Friedrich Mische
Friedrich Papke
By Blum, Moscovitz, Freedman
& Blum
Attorneys

United States Patent Office 3,094,911
Patented June 25, 1963

3,094,911
PHOTOGRAPHIC CAMERA
Wilhelm Reiche, Friedrich Mische, and Friedrich Papke, all of Braunschweig-Gliesmarode, Germany, assignors to Voigtländer A.G., Braunschweig, Germany, a corporation of Germany
Filed Dec. 7, 1959, Ser. No. 857,798
Claims priority, application Germany Dec. 9, 1958
16 Claims. (Cl. 95—10)

This invention relates to photographic cameras and it has particular relation to photographic cameras of the type in which light rays from the finder image reach the camera operator's eye through a prism.

It has been known from the art to provide views of the scales necessary for adjustment of the camera, as well as of the pointer of an electric exposure meter, in or near the image field of finders for photographic cameras, so that the camera operator, while looking through the finder, can adjust the exposure time and diaphragm aperture with reference to the reading of the exposure meter and, by reference to the distance scale, sharply focus the objective. In such arrangements, either images of the adjusting scales on the shutter and objective mount are provided in or at the viewfinder image by means of supplementary optical means or, supplementary scale carriers are provided and which can be seen by one looking through the finder. In the case of reflex cameras, the supplementary scales, or supplementary images thereof, can be seen upon looking at the ground glass plate, or through the field lens. Such cameras are described in the U.S. Patent No. 2,330,613 (see particularly FIG. 1) and No. 2,340,622 (see particularly FIG. 3).

The main object of the present invention is to provide in a photographic camera a particularly simple and advantageous viewfinder of the mentioned type in which, in addition to the prism disposed in the path of light rays reaching the eye of an observer looking through the viewfinder, there is provided additional optical means associated with such prism and aranged to provide in or immediately adjacent the finder fiield of view an image or view of exposure condition adjusting scales and the like.

These supplementary optical means can be arranged on a prism surface which is not in the path of the rays from the finder image. In this case, the view or image of the adjusting scales or the like can be seen, upon looking into the finder, outside the finder image. However, the view or image of these adjusting scales or the like will be visible within the finder image, if the supplementary optical means are arranged on a prism surface which is in the path of rays from the finder image. If desired, the view or image of the adjusting scales or the like can be provided partly within the image field of the finder and partly outside the same, if the supplementary optical means are arranged on the prism at the intersection of a first prism surface in the path of rays from the finder image and a second prism surface not in such path.

The supplementary optical means preferably consist of a supplementary prism which is applied to the usual finder prism in such manner that it has an entrance surface for light rays facing the adjusting scales located on the shutter and the objective mount, and an exit surface for the rays facing the usual finder prism. In order to increase the size of the image field provided by the supplementary prism, a lens can be arranged in front of its entrance surface, so that it is possible, in spite of the small volume of the supplementary prism—to render visible parts of an exposure time scale, diaphragm scale, distance scale and, if present, also a device for indicating the range of depth of focus, in, or near, the finder image.

The invention can be applied with particular advantage to cameras in which the pointer of an electric exposure meter and a follow-up mark, coupled with the exposure value adjuster of the shutter, are visible in or at the finder image field. Due to the visibility in the finder of the scales for shutter time, diaphragm, distance and depth of focus, all adjustments necessary for a photographic picture can be effected while looking into the finder.

For an understanding of the principles of the invention, reference is made to the following description of typical embodiments thereof as illustrated in the accompanying drawings. In the drawings.

Figure 1:
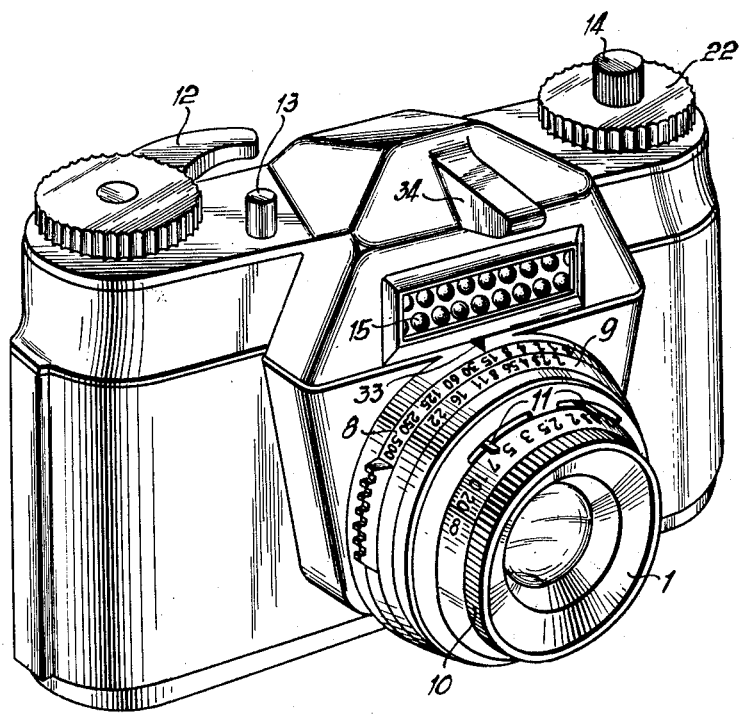
FIG. 1 is a perspective view of a single lens reflex camera embodying the invention.
Figure 2:
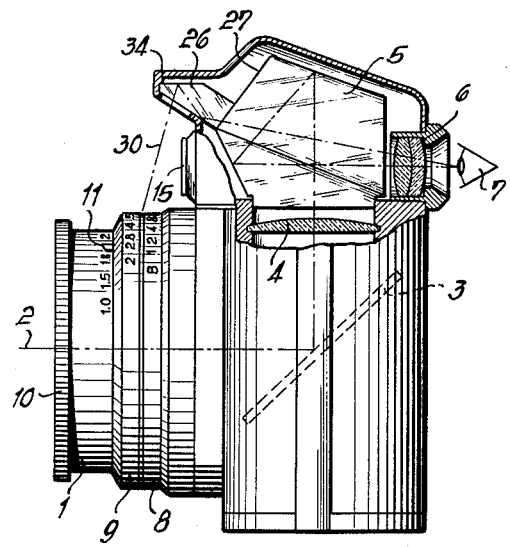
FIG. 2 is a side elevational view, partly in section, of the camera shown in FIG. 1.
Figure 3:
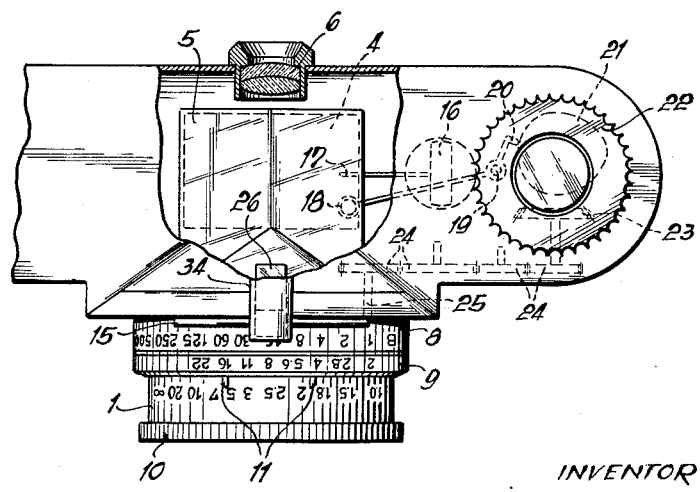
FIG. 3 is a top plan view, partly in section, of the camera shown in FIG. 1.
Figure 4:
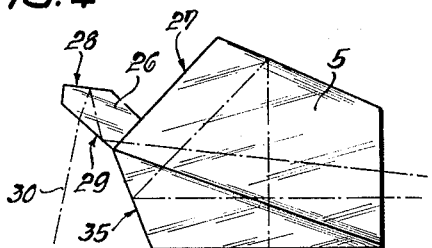
FIGS. 4 through 8 are side elevational views of viewfinder prisms having different supplementary prisms mounted thereon for providing images of the exposure condition adjusting scales.

Referring now to the drawings in detail, the camera illustrated in FIGS. 1–3 is a single lens reflex camera. The beam 2 which enters the picture taking objective 1 (see FIG. 2) is reflected to a field lens 4, in conventional manner, by a hingedly mounted mirror 3. The finder image formed by lens 4 can be observed by the eye 7, through a prism 5 and an ocular 6, in upright and laterally correct position.

The camera shown in FIGS. 1 through 3 has an objective shutter with which are associated an exposure time adjusting ring 8, carrying a corresponding scale, and a diaphragm adjusting ring 9. A distance adjusting ring 10 carries a scale cooperable with indicators 11, for the depth of focus, imprinted or otherwise carried by diaphragm adjusting ring 9. These indicators 11 cooperate with the scale on ring 10 in a manner known per se.

A film winding lever is shown at 12, a shutter release key at 13 and a film rewind knob at 14. A light-sensitive cell 15 (see FIG. 1) is connected with an electric exposure meter 16 (FIG. 3), which is arranged in the camera body in such manner that the tip of its pointer 17 can play in the range between field lens 4 and prism 5. Coordinated with pointer 17 is a follow-up mark 18, which is pivotably mounted at 19 and has a contact arm 20 which is spring biased against a control cam 21. This cam 21 is fixedly connected with an adjusting knob 22, so that follow-up mark 18 can be caused to move by turning knob 22. In a known manner, knob 22, when turned, operates a shaft 25 through a bevel gear 23 and spur gears 24. Shaft 25, which projects from the shutter casing, constitutes the driving member of a control mechanism which is known per se and acts on the adjusting rings for exposure time and diaphragm. These parts are arranged in such manner that, when follow-up mark 18 is brought to coincidence with pointer 17 by turning button 22, at the same time correct adjustment of the shutter time and diaphragm value is attained, conformity with the available light conditions.

Due to the above described arrangement of the pointer 17 and follow-up mark 18, these parts 17, 18 are visible to the eye looking into the finder, as indicated in FIGS. 9–11 and 13. Thus, adjustment of shutter time and diaphragm value in conformity with the exposure value based on the reading of the exposure meter, is brought about by turning knob 22, while looking into the finder.

In order to render it possible to observe the adjusted values of shutter time and diaphragm during adjustment of the follow up mark 18, in the example shown in FIGS. 1–4 a prism 26 is cemented to prism 5. This prism 26 is seated on a surface 27 (of prism 5) which does not contribute to the formation of the finder image and is, therefore, not metalized.

A beam of light rays 30 which forms an image of at least parts of the scales of adjusting rings 8 and 9, is reflected from metalized surface 28 of prism 26 to metalized surface 29 thereof and thereby directed through prism 5 to the eye of the observer.

Figure 9:
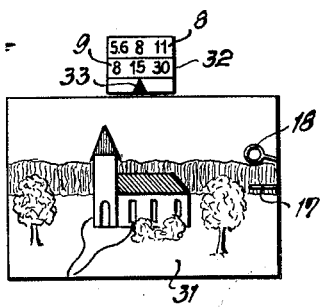
FIGS. 9 through 11 are pictorial representations illustrating various images appearing to an observer looking into the eye-piece of the viewfinder.

The observer then sees the image shown in FIG. 9, wherein the image of exposure meter pointer 17 and the follow-up mark 18 appear within one lateral margin of the finder field of view 31. The images of parts of the scales of rings 8 and 9, as well as the image of the coordinated adjusting mark 33, appear in a field of view 32 disposed outside the field of view 31. After adjustment of folow-up mark 18 into coincidence with pointer 17, if the adjusted combination of shutter time and diaphragm aperture opening as viewed in field 32 is not suitable for the contemplated picture, as, for example, not providing the desired depth of focus, or due to movement of the object, then another combination of exposure time and diaphragm aperture opening, within the adjusted exposure value, can be provided in a known manner by turning the adjusting ring 8 while observing the scales and the mark 33 as appearing in the field of view of the observer looking into the finder. The prism 26 is covered by a corresponding extension 34 of the camera cap and is thus protected from damage, as shown particularly in FIGS. 1 and 2.

Figure 5:
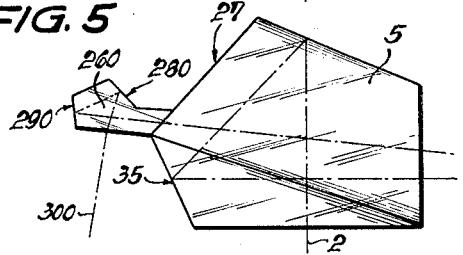

The image illustrated in FIG. 9 also appears in the finder if a prism 260 (shown in FIG. 5) is cemented to prism 5. In this case beam of rays 300, which forms the images of the scales of rings 8 and 9 and of mark 33, is reflected from metalized surfaces 280 and 290 and thus directed through to prism 5 in the manner described already above.

Figure 6:
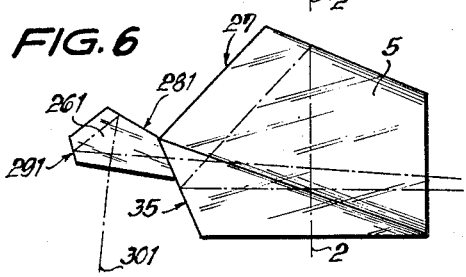
Figure 10:
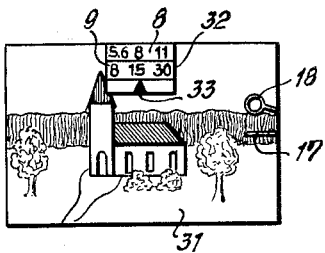
Figure 7:
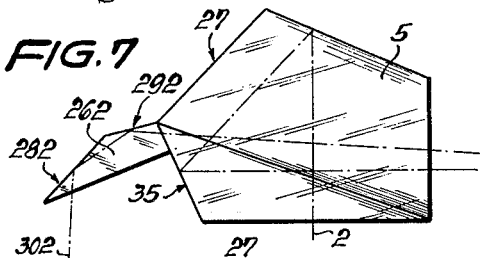

In the examples shown in FIGS. 6 and 7, prisms 261 and 262, which are cemented to prism 5, are arranged on that surface 35, of prism 5, which serves for erecting the finder image. Metalizing of surface 35 is interrupted in the area to which prisms 261 and 262 are cemented. In the arrangement of FIG. 6, the light ray beam 301 providing the image of the scales on rings 8 and 9 is reflected from metalized surfaces 281 and 291 of prism 261 and thereby directed through the prism 5 to the eye of the observer. In the case of FIG. 7, the light ray beam 302 forming the image of the scales on rings 8 and 9 is reflected from the metalized surfaces 282 and 292 of prism 262 and thus directed through the prism 5 to the eye of an observer. In both cases, the image viewed by the observer appears as shown in FIG. 10. By reference to this figure it will be noted that, in addition to pointer 17 and follow-up mark 18, there appears entirely within the field of view 31 of the finder, the field of view 32 showing portions of the scales on rings 8 and 9 as well as the adjusting mark 33.

Figure 8:
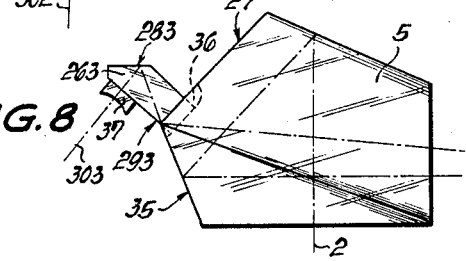
Figure 11:
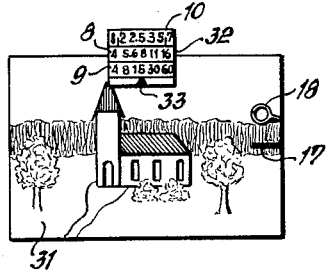

In the example shown in FIG. 8, surface 27 of prism 5 is provided with a milled recess 36, into which a prism 263 is cemented. A negative lens 37 is cemented to the light ray entering surface of prism 263, so that the beam of light rays 33 providing the image of the scales on the rings 8 and 9 covers a substantially larger field. This beam 33 is reflected by the metalized surfaces 283 and 293 of prism 263 and thereby directed through the prism 5. The observer looking through the finder will see the image shown in FIG. 11. In this image the area 32, which appears partially within and partially outside of the finder image 31, due to the above described manner of cementing prism 263 to prism 5, shows, in addition to the scales for exposure time and diaphragm, the scale of focusing ring 10, as well as the two indicators 11 for the depth of focus range. Thus, while an observer is looking through the finder, the adjustment of the correct exposure value, in conformity with available exposure conditions, can be effected by reference to the positions of pointer 17 and follow-up mark 18. Furthermore, and if desired, a different combination of exposure time and diaphragm can be selected and, moreover, the objective can be sharply focused while observing the distance scale and the indicators for the depth of focus range.

Thus, in the above described examples, images of the scales and marks located in the shutter and on the objective mount are provided in or near the field of view of the finder by means of optical means arranged on the finder prism. The finder prism and the optical member seated thereon may have, of course, designs or shapes which are different from those described above and illustrated in the drawings. The supplemental optical means can be seated in positions other than those specifically illustrated in the drawings, and they can form a unitary structural unit with the finder prism.

Figure 12:
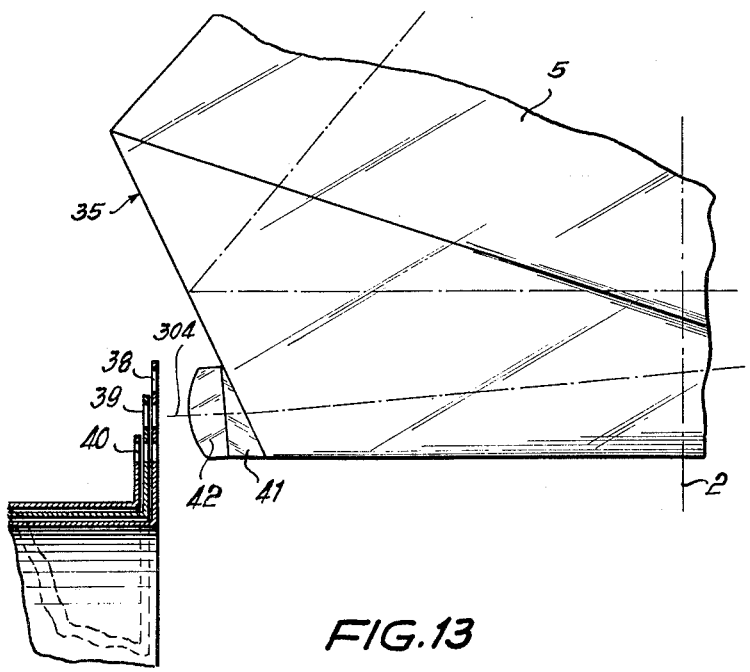
FIG. 12 is a view similar to FIGS. 4 through 8 but illustrating a modified form of the invention and on an enlarged scale in comparison with FIGS. 4 through 8.
Figure 13:
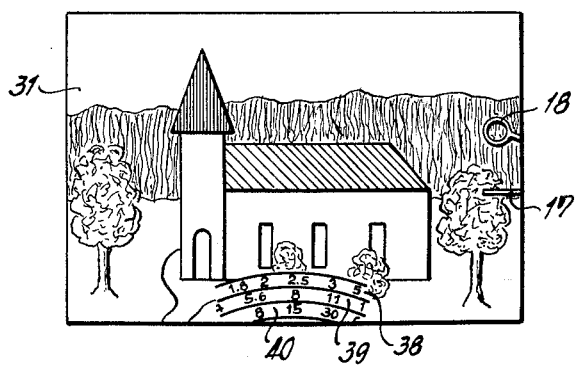
FIG. 13 is a pictorial illustration of the image seen by an observer looking into the eye-piece of the viewfinder.

In the embodiment shown by way of example in FIG. 12, transparent scale carriers 38, 39 and 40 are fastened to the adjusting rings for exposure time, diaphragm and distance. These scale carriers overlap the surface 35 of prism 5, and this surface has its metalizing interrupted at the area facing the scale carriers. An optical wedge 41 is cemented to the non-metalized portion of the surface 35, and a lens 42 is cemented to the wedge 41. The beam of light rays 304 providing the images of the scale carriers 38, 39, 40 passes through prism 5 to the eye of the observer, so that the latter will have a view such as indicated in FIG. 13. Referring to this figure, within the field of view of the range finder there appear, in addition to the pointer 17 and the follow-up mark 18, the carriers 38, 39 and 40.

It will be understood from the above that this invention is not limited to the constructions, arrangements, steps designs and other details specifically described above and illustrated in the drawing and can be carried out with various modifications without departing from the scope of the invention as defined in the appended claims.

What is claimed is:

1. A photographic camera comprising, in combination, a viewfinder including a prism having an insight surface through which the line of sight of an observer is directed, and reflecting surfaces directing light rays forming the finder image into the eye of an observer along such line of sight; an objective mount projecting externally of the camera body; exposure condition adjusting components movably supported on the projecting portion of said mount and carrying indicia for use in setting exposure conditions; and fixedly positioned optical means having a first surface mounted on and forming an interface with a non-reflecting surface portion of said prism, and a second surface facing said indicia; said optical means directing light rays entering said second surface through said interface, and in a straight line from said interface through said insight surface to provide an image of at least part of said indicia in the field of view of an observer viewing said finder image.

2. A photographic camera as claimed in claim 1 in which said fixedly positioned optical means is mounted on a light permeable surface of said prism other than said reflecting surfaces.

3. A photographic camera as claimed in claim 1 in which said fixedly positioned optical means is mounted on a light permeable surface portion of one of said reflecting surfaces.

4. A photographic camera as claimed in claim 1 in which said fixedly positioned optical means is mounted on a light permeable surface portion of said prism at the intersection of one of said reflecting surfaces with another surface of said prism, said other surface being out of the path of light rays forming the finder image.

5. A photographic camera as claimed in claim 1 in which said fixedly positioned optical means comprises a second prism.

6. A photographic camera as claimed in claim 5, comprising a lens for enlarging the image area to be viewed, said lens being arranged in front of said second surface of said second prism.

7. A photographic camera as claimed in claim 5, in which said second surface of said second prism forms an angle with the surfaces carrying said indicia.

8. A photographic camera as claimed in claim 5, in which said second prism has two reflecting surfaces for the light rays forming the images of said arranged indicia, relative to each other in such manner that the beam of said last-named light rays passes through the second prism without intersecting itself therewithin.

9. A photographic camera as claimed in claim 8, in which one of the reflecting surfaces of the second prism is in the same plane as the entrance surface for the light rays forming the image of said indicia.

10. A photographic camera as claimed in claim 5, in which said second prism has two reflecting surfaces for the light rays forming the image of said indicia arranged relative to each other in such manner that the beam of said last-named light rays, and which passes through said second prism, intersects itself therewithin.

11. A photographic camera as claimed in claim 1, in which said first-named prism has a recess in said non-reflecting surface portion and said optical means is fastened by cementing in said recess.

12. A photographic camera as claimed in claim 1 in which said indicia are on scale carriers operatively connected to said exposure condition adjusting components; said scale carriers projecting into the field of said second surface of said optical means.

13. A photographic camera as claimed in claim 12, in which said optical means comprises a wedge attached to said surface portion of said first-named prism, and a lens attached to the outer surface of said wedge, said lens and said wedge having the light rays forming the image of said scale carriers passing therethrough.

14. A photographic camera as claimed in claim 1, in which the camera has a cap formed with an extension for protecting said optical means.

15. A photographic camera as claimed in claim 1, including a field lens spaced from the insight surface of said prism toward the source of image-forming light rays, said field lens forming the finder image; an electric exposure meter built-in in the camera and having a pointer; a follow-up mark coordinated with said pointer and coupled to one of said exposure condition adjusting components; said pointer and said follow-up mark extending into the space between the insight surface of said prism and said field lens so that said pointer and follow-up mark are visible in the field of view of the viewfinder.

16. A photographic camera as claimed in claim 1, in which said optical means erects the image provided thereby in advance of said interface.

References Cited in the file of this patent

UNITED STATES PATENTS

| | | |
|---|---|---|
| 2,242,043 | Sanger | May 13, 1941 |
| 2,556,431 | Mihalyi | July 12, 1951 |
| 2,784,654 | Meyer | Mar. 12, 1957 |
| 2,932,242 | Greger | Apr. 12, 1960 |
| 2,933,991 | Sauer | Apr. 26, 1960 |